United States Patent Office 3,527,254
Patented Sept. 8, 1970

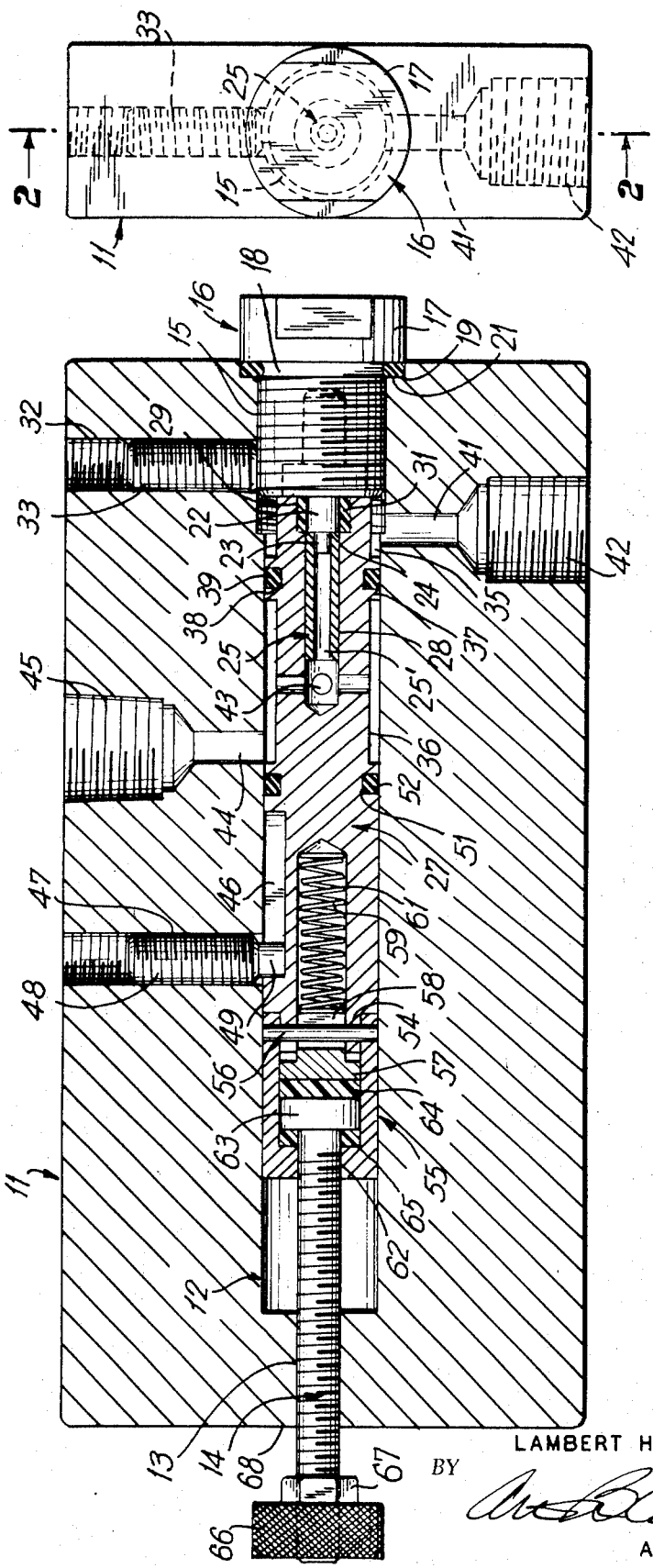

3,527,254
FLOW CONTROL VALVE
Lambert H. Mott 3rd, Hartford, Conn., assignor to Mott Metallurgical Corp., Hartford, Conn., a corporation of Connecticut
Filed July 10, 1968, Ser. No. 743,747
Int. Cl. F16k *1/06*
U.S. Cl. 137—625.3
9 Claims

ABSTRACT OF THE DISCLOSURE

This invention relates to the art of flow control valves, more particularly of the type which permits precise regulation of the quantity of fluid flowing therethrough, said valve comprising a longitudinally movable plunger which controls the longitudinal displacement of a seal between an inlet and outlet port, progressively to expose a porous metal sleeve for flow of fluid through such sleeve.

---

As conductive to an understanding of the invention, it is to be noted that where it is desired to provide precise regulation of gas flow in the very low flow ranges, i.e., in the order of zero to 500 standard cc. of gas per minute at 60 p.s.i. inlet pressure, if the flow through a control valve used for the purpose is non-linear or not consistent with a given displacement, the valve cannot be used in situations where precise controllable flow is required. Furthermore, where the valve does not give a constant repeated flow rate at each given setting thereof, the valve is also not desirable for precise measurements.

It is accordingly among the objects of the invention to provide a flow control valve which is relatively simple in construction having few parts that may readily be fabricated at relatively low cost and which may readily be adjusted to permit the quantity of fluid flowing therethrough to be precisely regulated and which will operate over a wide range of pressures and which, when reset to a given pressure, will provide substantially the same quantity of fluid flow at such reset position as originally provided.

According to the invention the valve comprises a plunger movable through a cylindrical bore and carrying an annular seal which normally cuts off communication between an inlet and outlet port and which is longitudinally movable by the plunger without rotary motion, progressively to expose the surface of a porous tube to provide correspondingly increased flow of fluid from the inlet port to the outlet port.

In the accompanying drawings in which is shown one of various possible embodiments of the several features of the invention;

FIG. 1 is an end view of the valve, and
FIG. 2 is a transverse sectional view taken along line 2—2 of FIG. 1.

Referring now to the drawings, the valve comprises a body portion of casing 11 having a bore 12 extending therethrough, said bore having a reduced diameter portion 13 at one end which in internally threaded to receive an adjustment screw 14. The other end 15 of bore 12 is internally threaded to receive an end closure plug 16, the latter having an enlarged diameter head 17 at its outer end. The root end of the plug 16 has an annular groove 18 in which an O-ring seal 19 is positioned, the latter being compressed against an annular shoulder 21 formed at the outer end of bore portion 15 to define a seal.

Extending inwardly from the threaded portion of the closure plug 16 is a reduced diameter axial stem 22 which in turn has a reduced diameter stud 23 extending axially therefrom. Encompassing the stud 23 and secured thereto, is one end 24 of a porous metering tube 25 illustratively of a sintered material. The end 24 of the tube 25 is secured to the stud 23 in any suitable manner such as by force fit or by bonding with a suitable epoxy resin. The outer diameter of the porous metering tube 25 is substantially the same as the outer diameter of the stem 22 so that the outer surface of tube 25 and stem 22 will form a substantially continuous surface.

Slidably mounted in the bore 12 of casing 11 is a cylindrical plunger 27 which has an axial bore 28 adjacent its inner end which slidably accommodates the metering tube 25. The outer end of bore 28 is of enlarged diameter as at 29 so as to accommodate a suitable sealing member such as a bushing 31 which is securely positioned in said bore portion 29 so as to move axially with the plunger 27. The bushing 31 which is of resilient material such as nylon, is designed to snugly encompass the stem 22 when the inner end of the plunger 27 has bottomed against the plug 16. The bushing will be compressed thereby providing a dependable seal.

Desirably, the casing 11 has an integrally threaded bore 32 aligned with the plug 16 so that a set screw 33 in bore 32 may be tightened to prevent loosening of the plug 16.

The inner end of plunger 27 is of reduced outer diameter and has an annular rib 37 defining a pair of adjacent annular grooves 35 and 36. The annular rib 37 has an annular groove 38 therein in which a resilient O-ring seal 39 is positioned.

The annular groove 35 which defines an inlet chamber, is normally in communication with a transverse passageway 41, the outer end 42 of which is of enlarged diameter and internally threaded to receive a suitable fitting and defines the inlet port of the valve. The annular groove 26 which defines an outlet chamber, is in communication with the end of bore 28 of plunger 27 through radial bores 43. The groove 36 also is normally in communication with a transverse passageway 44, the outer end 45 of which is of enlarged diameter and internally threaded to receive a suitable outlet fitting and defines the outlet port of the valve.

In order to permit longitudinal movement of the plunger 27, yet restrain rotation thereof, a longitudinal groove or keyway 46 is provided in the outer periphery thereof longitudinally spaced from the groove 36. The casing 11 has a transverse bore 47 internally threaded to receive a set screw 48, the reduced diameter inner end 49 of which protrudes into said elongated longitudinal groove 46.

The periphery of the plunger 27 has an additional annular groove 51 between keyway 46 and annular groove 36 in which an O-ring seal 52 is positioned.

The outer end of plunger 27 is of reduced diameter as at 54 and such reduced diameter end is encompassed by a cup-shaped screw retainer 55, the latter being secured by transverse pin 56.

Slidably mounted in the cup-shaped retainer 55 is a plate or disc 57 which has a pair of spaced fingers 58 extending inwardly therefrom at right angles thereto which straddle the pin 56. A coil spring 59 positioned in an axial bore 61 in the outer end of plunger 27 reacts against said fingers 58.

The inner end of adjustment screw 14 which extends through an axial opening 62 in the floor of cup-shaped retainer 55, has a head 63 against the inner surface of which a resilient disc or cushion 64 is urged by said plate 57 due to the force exerted by coil spring 59. A resilient washer 65 encompasses the root end of screw 14 between its head 63 and the floor of the cup-shaped retainer 55 to form a seal.

To facilitate rotation of the adjustment screw 14, a knurled knob 66 is secured to the end thereof and a lock nut 67 encompasses the screw and may be rotated against the end 68 of the casing 11 to retain the screw in set position.

In the operation of the valve above described, a source of gas under pressure is connected to the inlet port 42 and the outlet port 45 is connected to the equipment to be fed by such gas with a controlled rate of flow determined by the setting of the adjustment screw 14.

With the valve in the position shown in which the plunger 27 is at its extreme or valve closed position to the right, the bushing 29 carried by the plunger 27 will provide a dependable seal and cut off communication between the annular groove 35 connected to the inlet port 42 and the annular groove 36 connected to the outlet port 45.

When the adjustment screw 14 is rotated in direction to move the latter to the left, due to the fact that the head 63 thereof is rotatable in the cup-shaped retainer member 55, the latter being restrained from rotation by the cross pin 56 extending through the plunger and the plunger being restrained from rotation by the set screw 48 coacting with keyway 46, there will be solely longitudinal movement of the plunger to the left from the position shown with corresponding longitudinal movement of the bushing 29.

As the end of the plunger carrying the bushing 29 is moved to the left, i.e., away from the plug 16, the end of the plunger carrying the bushing 29 will reach a position in which the bushing 29 will move slightly to the left of the right-hand end of the porous tube 25.

At such time there will be a slight communication provided between the annular groove 35 and the porous tube 25. Thus, the gas under pressure will flow through the exposed portion of the porous tube 25 into the bore 25' thereof and thence through radial bores 43 into annular groove 36 and thence through outlet port 45.

As the total flow of gas is through the porous tube 25, the quantity of gas flow per unit time will be related to the rotational displacement of the adjustment screw 14 and corresponding longitudinal displacement of the bushing 29 carried by the plunger.

Assuming that the distribution of permeability of the porous tube 25 is uniform, since the movement of the sealing bushing 29 is longitudinal of the porous tube, there will be a completely linear relationship between the angular rotation of the adjustment screw 14 and the quantity of gas flow.

Thus, there is assurance that each time the adjustment screw is set to a particular position there will be a predetermined gas flow at such position.

It is of course within the scope of the invention to obtain any desirable curvilinear relationship between screw rotation and gas flow by introducing a permeability gradient in the porous wall of the metering tube 29. This may be accomplished by changing the density of such wall along its axis or through the use of internal metering sleeves as described in U.S. Pat. No. 3,264,720.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A flow control valve comprising a casing having a bore therethrough, a plunger positioned in said bore and longitudinally movable therein, said bore having an inlet port and an outlet port in communication therewith, a closure plug in one end of said bore, said plug having a reduced diameter inwardly extending axial stem, a further reduced diameter stud extending axially inward from the inner end of said stem, a porous metering tube positioned in said bore between said ports, one end of said metering tube encompassing and being secured to said stud and extending axially inward therefrom, said plunger having an axial bore at one end slidably to receive said porous tube, annular sealing means carried by said plunger encompassing said stem when the valve is in closed position to cut off communication between said ports through said porous tube, said annular sealing means being movable longitudinally of said porous tube upon longitudinal movement of said plunger, to provide progressively increased communication between said ports through said porous tube.

2. The combination set forth in claim 1 in which said stem and said metering tube have the same outer diameter to provide a continuous surface for movement of said sealing annulus therealong.

3. The combination set forth in claim 1 in which said plunger is of reduced outer diameter at the end thereof associated with the axial bore therein, an annular rib encompassing said reduced diameter portion and defining an annular chamber on each side thereof, said inlet port being in communication with one of said annular chambers and said outlet port being in communication with said other annular chamber, means providing communication between the inner end of said axial bore in said plunger and the annular chamber in communication with said outlet port, whereby upon movement of said plunger in direction to move said sealing means away from said stem the exposed portion of said metering tube will provide communication between said ports.

4. The combination set forth in claim 3 in which said annular rib has an annular groove and a resilient sealing member is positioned in said annular groove to define a seal with respect to the inner surface of said bore, said plunger having an annular groove on the other side of said annular chamber in communication with said outlet port and a second sealing member positioned in said second annular groove.

5. The combination set forth in claim 1 in which the diameter of the bore of the casing at the end thereof opposed to said plug is reduced and internally threaded, an adjustment screw extends axially through said threaded portion into said bore, a cup-shaped retainer having its mouth encompassing the adjacent end of said plunger and secured thereto, said cup-shaped member having a transverse floor with an axial opening through which the inner end of said screw extends, a head scured to said inner end, sealing means positioned on opposed sides of said head, whereby upon rotation of said screw the plunger will be longitudinally moved in desired direction.

6. The combination set forth in claim 5 in which said plunger has a longitudinal groove in the outer surface thereof and a set screw extending transversely through said casing has its inner end positioned in said longitudinal groove to permit longitudinal movement of said plunger yet restrain rotation thereof.

7. The combination set forth in claim 5 in which the end of said plunger secured to said cup-shaped retainer has an axial bore, a coil spring positioned in said axial bore, said means to secure said cup-shaped retainer to said plunger comprises a pin extending transversely through said axial bore, a pressure plate having a pair of spaced fingers straddling said pin with the ends of said fingers being positioned in said axial bore, said coil spring reacting against said fingers to urge the associated sealing means in said cup-shaped retainer against the head of said screw.

8. The combination set forth in claim 7 in which one of said sealing means comprises a resilient disc interposed between said screw head and said pressure plate and the other of said resilient means comprising a resilient gasket encompassing the root end of said screw and interposed between the other surface of said head and the transverse floor of said cup-shaped member.

9. The combination set forth in claim 7 in which an adjustment knob is secured to the end of said screw protruding from said casing.

References Cited

UNITED STATES PATENTS

| | | | |
|---|---|---|---|
| 756,346 | 5/1904 | Farrell | 251—264 |
| 1,484,740 | 2/1924 | Rubino | 251—264 |
| 2,887,129 | 5/1959 | Stear | 251—205 X |
| 3,168,111 | 2/1965 | Strauss | 137—625.3 |
| 3,264,720 | 8/1966 | Mott | 29—191.2 X |

ARNOLD ROSENTHAL, Primary Examiner